United States Patent Office 2,968,532
Patented Jan. 17, 1961

2,968,532
PREPARATION OF POTASSIUM BOROHYDRIDE

George L. Cunningham, Cleveland, Ohio, and John M. Bryant and Emily M. Gause, San Antonio, Tex., assignors to Callery Chemical Company, Pittsburgh, Pa., a corporation of Pennsylvania No Drawing. Filed Dec. 1, 1954, Ser. No. 472,534

7 Claims. (Cl. 23—204)

This invention relates to new and improved methods for preparing potassium borohydride ($KBH_4$) and more particularly it relates to methods whereby sodium borohydride ($NaBH_4$) is reacted with potassium thiocyanate (KCNS) in an amine or a nitrile solution to produce potassium borohydride and sodium thiocyanate.

Potassium borohydride is a useful reducing agent in many organic reactions. Its use as such has been limited because methods for preparing it have produced low yields or have required the use of intermediates made from metallic potassium which is more expensive than metallic sodium. Recently, sodium borohydride has become available in commercial quantities which makes this compound economically attractive as a starting material for producing potassium borohydride metathetically provided suitable solvents are found for effecting the conversion.

It is an object of this invention to provide new and improved methods for preparing potassium borohydride metathetically from sodium borohydride. Another object is to provide suitable solvents for the reaction of sodium borohydride with potassium thiocyanate to produce potassium borohydride in substantially quantitative yield. A still further object is to provide methods for preparing potassium borohydride by the reaction of sodium borohydride with cheap and readily available potassium salts in inexpensive solvents. Other objects will become apparent from the specification and claims which follow.

These new and improved methods will be more fully described in the specification and the novelty thereof will be particularly pointed out and distinctly claimed.

This invention is based upon the discovery that potassium borohydride is relatively insoluble in amines such as n-butylamine and lower organic nitriles such as acetonitrile and thus may be produced metathetically from sodium borohydride which is relatively soluble in those solvents. We have experimentally determined the solubility of potassium borohydride and sodium borohydride at 25° C. in n-butylamine and acetonitrile to be as follows:

| Salt | Solubility at 25° C. in g. salt per 100 g. solvent | |
|---|---|---|
| | Acetonitrile | n-butylamine |
| $KBH_4$ | 0.29 | 0.08 |
| $NaBH_4$ | 2.00 | 4.90 |

Both sodium and potassium thiocyanate are quite soluble in amines such as n-butylamine and the lower organic nitriles such as acetonitrile, propionitrile and butyronitrile. We have discovered that when solid sodium borohydride is added to a solution of potassium thiocyanate in a lower nitrile such as acetonitrile a reaction occurs and solid potassium borohydride is precipitated which can be removed by filtration or other suitable means. The filtrate contains sodium thiocyanate. The solubility system comes to equilibrium rapidly and there is no tendency for the precipitated potassium borohydride to stick to the reacting salts and thus mask the reaction. However, when solid sodium borohydride is added to a solution of potassium thiocyanate in n-butylamine considerable masking of the reaction occurs and pure potassium borohydride is not obtained. This difficulty can be avoided by dissolving both reacting salts in n-butylamine and mixing the two solutions. In this manner, we have discovered that the solubility system comes to equilibrium rapidly and anhydrous potassium borohydride is precipitated.

When sodium borohydride is reacted with potassium thiocyanate in a lower organic nitrile such as acetonitrile in any proportion the percentage of borohydride ion precipitated as potassium borohydride is high based on the amount of borohydride present in the slurry. However, it is preferable to react equivalent amounts of the two reactants so that the filtrate will contain substantially pure sodium thiocyanate. The amount of nitrile should be limited to that amount which will just dissolve the resulting sodium thiocyanate. This assures the highest yields of potassium borohydride and gives a nitrile solution which is saturated with sodium thiocyanate. In this manner the amount of solution which must be handled and evaporated in order to recover the sodium thiocyanate is decreased. The wet cake of potassium borohydride produced in this process is washed with methanol containing 1% potassium hydroxide by weight, then dried under vacuum at room temperature. A solid product is obtained which contains over 92% potassium borohydride. Nitriles higher than butyronitrile are not desirable as solvents in this process since their vapor pressures are low which causes difficulty in recovering the sodium thiocyanate by evaporation of the solvent.

When one mol of sodium borohydride dissolved in n-butylamine is mixed with one mol of potassium thiocyanate dissolved in the same solvent about 96% of the borohydride ions are precipitated as potassium borohydride. It is preferable to use saturated solutions because it has been found that when more dilute solutions are used the yield of potassium borohydride will be lower. N-butylamine is preferred as an amine solvent since it has a vapor pressure high enough at low temperatures to permit easy recovery of the solvent. The lower amines are not preferred since their vapor pressures at room temperature are quite high which necessitates the use of pressure equipment.

In one experiment, 97.1 g. of potassium thiocyanate and 37.8 g. of sodium borohydride were mixed with 460 g. of acetonitrile. The slurry was stirred for four hours at 25° C. and filtered to obtain 51.5 g. of potassium borohydride. This was a 95.5% yield based on the borohydride ions in the slurry. The wet crystals of potassium borohydride were washed with methanol containing 1% potassium hydroxide by weight and the washed crystals were vacuum dried at room temperature. The solid product obtained contained 92.1% potassium borohydride.

In another experiment, 17.1 g. of potassium thiocyanate dissolved in 117.5 g. of n-butylamine were mixed with 6.7 g. of sodium borohydride dissolved in 109 g. of n-butylamine and the slurry was stirred for four hours at 25° C. When the slurry was filtered, 9.0 g. of potassium borohydride were obtained. The wet cake was washed with methanol containing 1% potassium hydroxide by weight and vacuum dried at room temperature. A product containing 98% potassium borohydride resulted.

Having thus described our invention fully and completely as required by the patent statutes, it should be understood that this invention may be practiced otherwise than as specifically described.

What we desire to claim and secure by Letters Patent of the United States is:

1. A method of preparing potassium borohydride which comprises reacting sodium borohydride with potassium thiocyanate in a lower alkyl nitrile and recovering the potassium borohydride which precipitates.

2. A method according to claim 1 in which the sodium borohydride and potassium thiocyanate are reacted in equimolar amounts.

3. A method according to claim 1 in which the sodium borohydride is added as a solid to a solution of potassium thiocyanate in butyronitrile.

4. A method according to claim 1 in which the sodium borohydride is added as a solid to a solution of potassium thiocyanate in propionitrile.

5. A method according to claim 1 in which the sodium borohydride is added as a solid to a solution of potassium thiocyanate in acetonitrile.

6. A method according to claim 1 in which the wet crystals of potassium borohydride are washed with a solution of methanol containing 1% potassium hydroxide by weight.

7. A method according to claim 6 in which the washed crystals of potassium borohydride are vacuum dried at room temperature.

References Cited in the file of this patent

UNITED STATES PATENTS

| | | |
|---|---|---|
| 2,726,926 | Paul et al. | Dec. 13, 1955 |
| 2,741,540 | Bragdon et al. | Apr. 10, 1956 |

FOREIGN PATENTS

| | | |
|---|---|---|
| 1,046,081 | France | July 8, 1953 |

OTHER REFERENCES

Nature, vol. 173, No. 4394, pages 125–6 (January 16, 1954).

Banus et al.: "JACS," vol. 76, July 20, 1954, pages 3848–9.

Schlesinger et al.: "Journal of American Chemical Society," vol. 75, January 5, 1953, pages 199–204. (Pertinent disclosure on page 203.)